United States Patent
Bordoni et al.

(10) Patent No.: US 10,907,486 B2
(45) Date of Patent: Feb. 2, 2021

(54) TURBOMACHINE MODULE COMPRISING A ROTOR SUPPORTING PITCHABLE BLADES

(71) Applicant: SAFRAN AIRCRAFT ENGINES, Paris (FR)

(72) Inventors: Nils Edouard Romain Bordoni, Melun (FR); Michel Gilbert Roland Brault, Quincy-sous-Sénart (FR); Romain Guillaume Cuvillier, Cesson (FR); Guillaume Patrice Kubiak, Saint-Pierre-du-Perray (FR); Arnaud Nicolas Negri, Yerres (FR); Nathalie Nowakowski, Cesson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 245 days.

(21) Appl. No.: 15/982,319

(22) Filed: May 17, 2018

(65) Prior Publication Data

US 2018/0334915 A1 Nov. 22, 2018

(30) Foreign Application Priority Data

May 18, 2017 (FR) ...................................... 17 54382

(51) Int. Cl.
*F04D 7/00* (2006.01)
*F01D 7/00* (2006.01)
(Continued)

(52) U.S. Cl.
CPC .............. *F01D 7/00* (2013.01); *B64C 11/325* (2013.01); *B64C 11/385* (2013.01);
(Continued)

(58) Field of Classification Search
CPC ....... F01D 7/00; B64C 11/326; B64C 11/385; B64C 11/06; B64C 11/30; F04D 29/362;
(Continued)

(56) References Cited

U.S. PATENT DOCUMENTS

2011/0206516 A1  8/2011  Henriksen
2011/0286842 A1* 11/2011  Danielson ............. B64C 11/306
                                                  416/1

FOREIGN PATENT DOCUMENTS

CN      105620770 A    6/2016
FR       1040646 A    10/1953
(Continued)

OTHER PUBLICATIONS

Rapport de Recherche Préliminaire / Opinion Écrite sur la Brevetabilité de l'Invention, mailed Jan. 31, 2018, issued in corresponding French Application No. 1754382, filed May 18, 2017, 7 pages.

*Primary Examiner* — Aaron R Eastman
*Assistant Examiner* — Maxime M Adjagbe
(74) *Attorney, Agent, or Firm* — Christensen O'Connor Johnson Kindness, PLLC

(57) ABSTRACT

A turbomachine module includes a rotor supporting variable pitch blades, and an inner annular shaft, a blade pitch control device, a device for feathering at least one blade comprising at least one gas generator placed between a body and a movable member. The control device and the feathering device are situated radially between the shaft and the blades, the movable member is coupled with the at least one blade and capable, under the action of the gas generated and/or released by the generator, of being moved into a reference position wherein it entails a feathered position to the at least one blade.

11 Claims, 6 Drawing Sheets

(51) Int. Cl.
  *B64C 11/32* (2006.01)
  *B64C 11/38* (2006.01)
  *F04D 29/36* (2006.01)
(52) U.S. Cl.
  CPC ........ *F04D 29/362* (2013.01); *F05D 2220/36* (2013.01); *F05D 2260/74* (2013.01); *F05D 2260/79* (2013.01)
(58) Field of Classification Search
  CPC ............. F05D 2220/36; F05D 2220/74; F05D 2220/79
  See application file for complete search history.

(56) References Cited

FOREIGN PATENT DOCUMENTS

| | | |
|---|---|---|
| FR | 3011529 A1 | 4/2015 |
| GB | 623818 A | 5/1949 |

\* cited by examiner

TURBOMACHINE MODULE COMPRISING A ROTOR SUPPORTING PITCHABLE BLADES

TECHNICAL FIELD

Embodiments of the present disclosure relate to a turbomachine module comprising a rotor supporting variable pitch blades, and more specifically, a device for feathering the blades, adapted for such a turbomachine.

BACKGROUND

A turbomachine rotor equipped with pitchable (variable pitch) blades makes it possible to adjust the pitch (and more specifically the pitch angle) of the blades according to flight parameters, and thus to optimise the operation of the rotor, and generally, the turbomachine comprising such a rotor. As a reminder, the pitch angle corresponds to the angle, in a longitudinal plane perpendicular to the rotating axis of the blade, between the blade chord and the rotating plane of the fan.

To be certified, such a turbomachine must include a device for feathering the blades, in other words, a device makes it possible to position the blades in a position wherein the latter are removed as best as possible in relation to the forward direction. Generally, in the feathered position, the pitch angle of the blades is 90°. For example, the blades are put into the feathered position during a failure (or breakdown) of the blade pitch control device (for example, a failure of a hydraulic actuator) such that the latter offer the least resistance (drag) possible.

To increase the performance of the turbomachine, engineers continually look to reduce the hub ratio and the rotor mass. This hub ratio is the quotient between the diameter of the outer casing of the blade feet at the leading edge of the blades, and the diameter of a circle passing by the outer radial ends of these blades. At an equal turbomachine diameter, a decrease of the hub ratio, in other words, the diameter of the outer casing, entails an increase in the suction section of the rotor, in other words, an increase in the throughput, and consequently, an increase in the power output thereof.

Traditionally, the device for feathering the blades is placed radially between the blade pitch control device and the blade pivots, the latter being specific to each blade or common to all blades. The feathering device comprises, for example, a counterweight connected directly or via a gear mechanism to the blade pivot. In the example above, each counterweight is in this case capable of, under the centrifugal force, being moved into a reference position wherein it entails a feathered position to the corresponding blade.

The counterweights represent a significant mass. On the other hand, the latter form an integral part of the rotor, movable in rotation, it is thus necessary to consequently size the guide means of the rotor as well as the structure of the stator.

The prior art also comprises documents GB-A-623818, FR-A-1040646, US-A1-2011/206516, FR-A1-3011529, and CN-A-105620770.

An objective of the present disclosure is thus to propose a device for feathering blades, making it possible to decrease the hub ratio defined above and the rotor mass.

SUMMARY

The disclosure, for this purpose, proposes a turbomachine module of longitudinal axis X, the module comprising:

a rotor supporting variable pitch blades, and comprising an inner annular shaft;

a blade pitch control device;

a device for feathering at least one blade, in particular, in case of failure of the control device, the feathering device comprising a gas generator placed between a body and a movable member of an actuator;

wherein the control device and the feathering device are situated radially between the shaft and the blades, the member being coupled to the at least one blade and capable, under the action of gas generated and/or released by the generator, of being moved into a reference position wherein it entails a feathered position to the at least one blade.

Such a feathering device makes it possible, on the one hand, to significantly reduce the annular space (or oil enclosure), and thus the hub ratio, and on the other hand, to considerably reduce the rotor mass, to benefit the performance of the turbomachine.

The fact of having the control device and the feathering device situated radially between the shaft and the blades makes it possible to reduce the volume of the hub and more generally, the volume of the turbomachine module.

In an embodiment of the invention, the gas generator of the feathering device is autonomous, in other words, it self-generates the energy necessary for the feathering.

In an embodiment of the invention, the gas generator of the device for feathering the blades can either be a generator referred to a pyrotechnic (or hot gas) generator, or a generator referred to as a hybrid (or mixed) generator, or a generator referred to as a cold gas generator.

The turbomachine module according to the disclosure can comprise one or more of the following characteristics, taken by themselves or combined with each other:

the generator comprises a pyrotechnic charge and a device for igniting the pyrotechnic charge;

the generator comprises a pressurised gas tank, the tank being capable, under the action of combusting the charge or via a release device, of releasing the pressurised gas from the tank;

the member comprises a piston moving forward into a cavity of the body, the piston separating the cavity into a first chamber wherein the gas generator is situated and a second chamber, the actuator further comprising a first fluidic communication channel between the first chamber and the space and a second fluidic communication channel between the second chamber and the space, the actuator being configured to occupy the following positions:

a passive position wherein the first and second communication channels are open;

an active position wherein the first communication channel is blocked, the member is moved into a reference position under the action of the gas generated and/or released by the generator and the member is locked in a reference position via the locking means;

the actuator further comprises a tubular distribution slide moving forward into the cavity of the body, the slide comprising a separating partition delimiting the first chamber into a first compartment wherein the gas generator is situated and a second compartment, the partition comprising a communication orifice between the first compartment and the second compartment, the first channel being capable of putting the space and the second compartment in communication;

the slide being configured to block the first communication channel when the actuator is situated in an active position;

the member comprises a pallet moving in rotation in a cavity of the body, the pallet separating the cavity into a first chamber wherein the gas generator is situated and a second chamber, the actuator further comprising a first fluidic communication channel between the first chamber and the space and a second fluidic communication channel between the second chamber and the space, the actuator being configured to occupy the following positions:

a passive position wherein the first and second communication channels are open;

an active position wherein the first communication channel is blocked, the member is moved into a reference position under the action of the gas generated and/or released by the generator and the member is locked in a reference position via the locking means;

the locking means comprise strips, between which the member is situated, the strips preferably being made of shape-memory alloy;

the blade pitch control device comprises the actuator; and the actuator comprises means for dampening the member when the latter is moved into the reference position thereof.

The disclosure has the second aim of a turbomachine comprising a turbomachine module such as defined above, the turbomachine further comprising means for controlling the feathering device.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
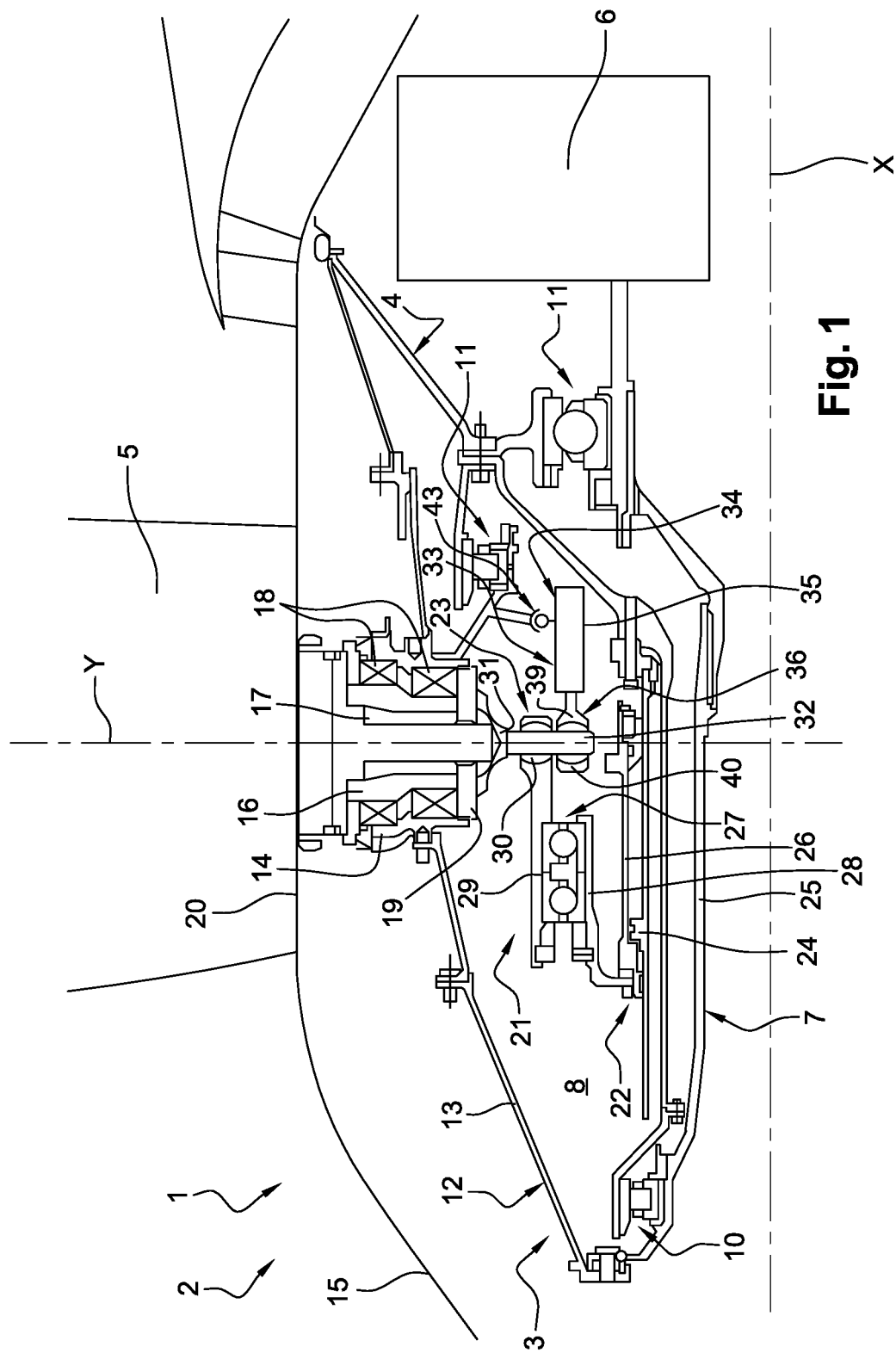
FIG. 1 is an axial (or longitudinal) cross-sectional view of a turbomachine module comprising a device for feathering blades comprising an actuator, according to a first embodiment.
Figure 8:
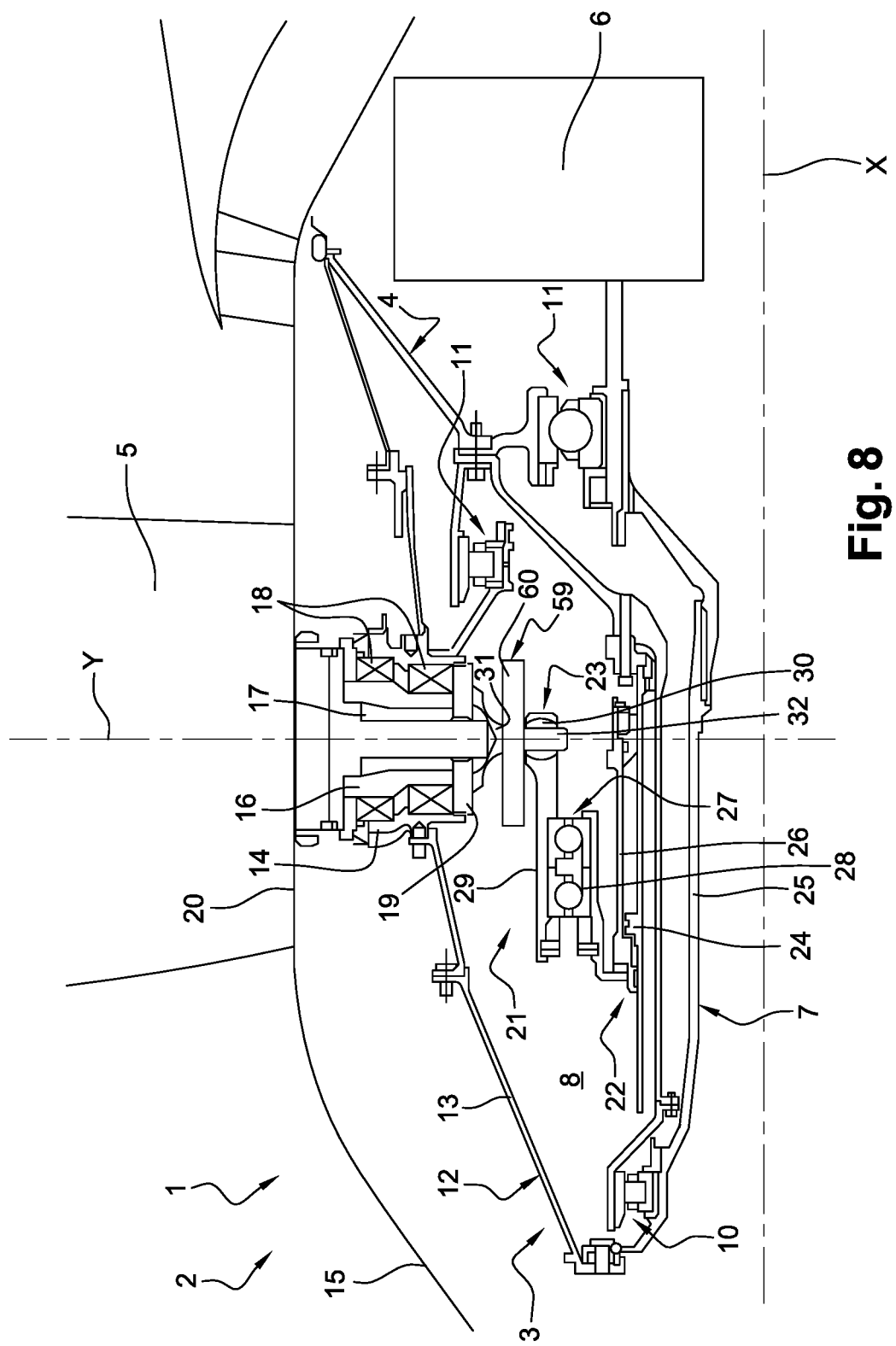
FIG. 8 is an axial cross-sectional view of a turbomachine module comprising a device for feathering blades comprising an actuator, according to a second embodiment.
Figure 10:
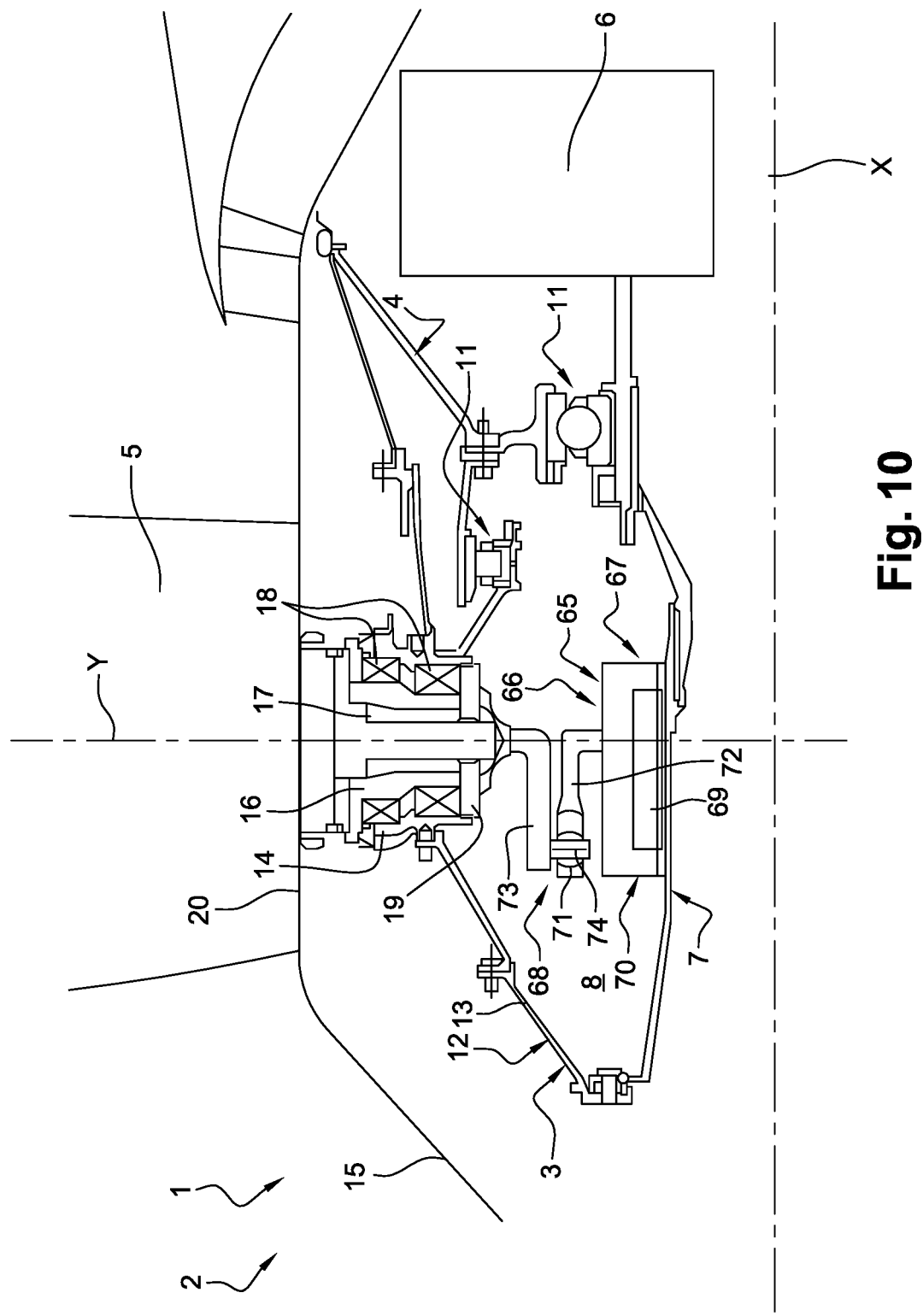
FIG. 10 is an axial cross-sectional view of a turbomachine module comprising a device for feathering blades comprising an actuator, according to a third embodiment.

FIGS. 1, 8, and 10 illustrate a ducted fan 1 of a turbomachine 2 having longitudinal axis X. The fan 1 comprises a rotor 3 movable around the axis X in relation to a secured casing 4, with a rotor 3 supporting a series of variable pitch blades 5. The fan 1 is upstream of the turbomachine 2 which typically includes, for example, successively from upstream to downstream, the fan 1, at least one compressor, a combustion chamber, at least one turbine, and one power turbine which drives the rotor 3 of the fan 1 via a speed reducer 6.

Conventionally and as used in the present application, the terms "upstream" and "downstream" are defined in relation to the direction of circulation, or flow, of gases in the fan 1 (or turbomachine 2). Likewise, conventionally and in the present application, the terms "internal" and "external", "inner" and "outer" are defined radially in relation to the longitudinal (or axial) axis X of the turbomachine 2, which is particularly the rotation axis of the rotors of the compressors and turbines of the gas generator.

The rotor 3 comprises an inner annular shaft 7. The fan 1 further comprises a blade pitch control device 21, 65. The fan 1 also comprises a device for feathering 33, 59, 66 at least one blade 5, in particular in case of failure of the control device 21, 65. The feathering device 33, 59, 66 comprises at least one gas generator 9 placed between a body 35, 61, 69 and a movable member 36, 62, 70 of an actuator 34, 60, 67. The control device 21, 65 and the feathering 33, 59, 66 device are situated radially between the shaft 7 and the blades 5. The movable member 36, 62, 70 is coupled with the blade 5 and is capable, under the action of gas generator and/or released by the generator 9, of being moved into a reference position wherein it entails a feathered position to the blade 5.

The turbomachine 2 includes means for controlling (comprising, in particular, a calculator, or processor) the feathering device 33, 59, 66.

The means for controlling the feathering device 33, 59, 66 (via the calculator) can order the passage of the actuator 34, 60, 67 into a reference position, in one or more of the following cases:

detection of a break in the supply (here hydraulic) of the control device 21, 65 via, for example, a pressure sensor;

detection of an extended stopping of the turbomachine 2;

request of the pilot.

In an embodiment of the disclosure, the gas generator 9 of the feathering device 33, 59, 66 is autonomous, in other words, it self-generates the energy necessary for the feathering.

In an embodiment of the disclosure, the gas generator 9 of the device for feathering 33, 59, 66 the blades 5 can either be a generator 9 referred to as pyrotechnic (or hot gas) generator, or a generator 9 referred to as hybrid (or mixed) generator, or a generator 9 referred to as cold gas generator.

More specifically, a pyrotechnic generator 9 comprises a pyrotechnic charge and a device for igniting (or initiating) the pyrotechnic charge. In the present case, the gas generated by the combustion of the pyrotechnic charge makes it possible to move the member 36, 62, 70 into the reference position thereof.

A hybrid generator 9, similar to the pyrotechnic generator 9, includes a pyrotechnic charge and a device for igniting the pyrotechnic charge. The hybrid generator 9 further includes a pressurised gas tank (or accumulator), this tank being capable, under the action of combusting the pyrotechnic charge or via a release device, of releasing the pressurised gas. In the present case, the mixture of the gas generated (pyrotechnic charge combustion) and of the gas released (release of the pressurised gas present in the tank) makes it possible to move the member 36, 62, 70 into the reference position thereof.

A cold gas generator 9 only comprises a pressurised gas tank and a device for releasing pressurised gas. In the present case, the gas released makes it possible to move the member 36, 62, 70 into the reference position thereof.

As an example, the pyrotechnic charge is, for example, propellant presented in the form of pellets. The pressurised gas(es) is/are, for example, argon and/or helium.

In a variant, it is noted that the gas generated and/or released can be used to inflate a flexible casing, so as to place the member 36, 62, 70 in the reference position thereof.

It is noted that when the blades 5 of the rotor 3 are placed in a feathered position, an immobilisation of the turbomachine 2 is subsequently necessary, particularly in order to replace the gas generator(s) 9.

It is noted that the exemplary embodiments illustrated in FIGS. 1, 8, and 10 are not limitative, the device for feathering 33, 59, 66 the blades 5 according to the disclosure could, for example, be incorporated to the rotor of a propeller of a turboprop or to the rotor of each one of the two propellers of a turbomachine comprising two counter-rotating propellers, better known under the name, "Open Rotor". In the definition of the disclosure, the term "fan" also covers the propeller or the propellers of such turbomachines.

Such a feathering device 33, 59, 66 is applied more generally to any turbomachine comprising a blade pitch control device for which a feathering device is necessary.

According to the example illustrated in FIGS. 1 and 8, the rotor 3 is guided in rotation in relation to the casing 4 secured by a bearing 10 situated upstream, and two bearings 11 situated downstream. According to the example illustrated in FIG. 10, the rotor 3 is guided in rotation in relation to the casing 4 secured only via two bearings 11 situated downstream.

According to the examples illustrated in FIGS. 1, 8, and 10, the rotor 3 comprises the inner annular shaft 7 centered on the axis X, and an outer annular ferrule 12 centered on the axis X and extending around the shaft 7. An axial end upstream of the shaft 7 is flanged to an axial end downstream of the ferrule 12, the shaft 7 and the ferrule 12 defining between themselves, the annular space 8 commonly called "oil enclosure". The shaft 7 and the ferrule 12 form a pin, in an axial cross-section. The shaft 7 of the rotor 3 is driven by the power turbine via the speed reducer 6. The ferrule 12 comprises, from upstream to downstream, a truncated wall 13, widening from upstream to downstream (in relation to the axis X) and a ring 14 for supporting the blades 5, this ring 14 being flanged on the wall 13. The rotor 3 further comprises an inlet cone 15 of the fan 1, centered on the axis X and widening from upstream to downstream.

According to the examples illustrated in FIGS. 1, 8, and 10, each blade 5 comprises a foot 16 mounted in a housing 17 of the ring 14 so that it can be moved in rotation around an axis Y (substantially radial) via two roller bearings 18, to form the pivot of the blade 5. The pivot of each blade 5 is isolated from the annular space 8 by the intermediary of a cover 19. The cover 19 further ensures the retention of the blade 5. The feet 16 of the blades 5 are covered by an outer annular casing 20 centered on X with a substantially circular section, the latter being substantially tangent to the downstream end of the cone 15, to ensure an aerodynamic continuity.

As a reminder, the diameter of the outer casing 20 at the level of the leading edge at the foot of the blades 5 is one of the components which makes it possible to determine the hub ratio.

The fan 1 comprises a blade pitch control device 21, 65 (or pitch of blades 5) around the blades' axis Y, and more specifically, the pitch angle of the blades 5 which correspond for a blade 5 to the angle, in a longitudinal plane perpendicular to the axis Y, between the blade 5 chord and the rotating plane of the fan 1. The control device 21, 65 is situated in the annular space 8.

The blades 5 are positioned in a "thrust reversal" position (known under the name, "reverse") in FIGS. 1, 8, and 10. In the "thrust reversal" position, the pitch angle of the blades 5 is negative. This position of the blades 5 makes it possible to generate a counter-thrust, and thus participate in slowing the aircraft down in addition to the brakes, so as to reduce the braking distance thereof during the landing.

The blades 5 can also be positioned in a feathered position (position not represented). In the feathered position, the pitch angle is positive and generally equal to 90°. This position of the blade 5 makes it possible to limit the resistance (drag) generated by the latter.

According to the example illustrated in FIGS. 1 and 8, the blade pitch control device 21 comprises a linear annular actuator 22, centered on the axis X, common to all blades 5 and a device for transforming movement 23 specific to each one of the blades 5, this transformation device 23 enabling to transform the linear movement initiated by the actuator 22 into a rotation movement of the corresponding blade 5.

More specifically, the linear actuator 22 comprises a secured body 24 put back on an annular support 25 (centered on X) of the secured casing 4 and a body 26 moving forward in relation to the secured body 24 along the axis X. Advantageously, the linear actuator 22 is hydraulic.

The control device 21 further comprises a load transfer bearing 27, better known under the acronym LTB, secured to the movable body 26 and enabling the transmission of the linear movement initiated by the actuator 22. The load transfer bearing 27 is a roller bearing (centered on the axis X) comprising an inner gasket mounted rigidly on an inner synchronisation ring 28 (centered on the axis X), secured to the movable body 26 of the actuator 22, and an outer gasket housed secured in an outer synchronisation ring 29 driving the pitch of the blades 5. The inner and outer gaskets define two rolling tracks for the rolling elements (here, balls).

The LTB makes it possible to ensure the transmission of the movement initiated by the actuator 22 (connected to the casing 4, fixed marker) to the rotating marker (connected to the rotor 3). Having an actuator in a fixed marker makes it possible to facilitate the supply thereof of oil and decrease the rotating masses.

The device 23 for transforming linear movement into rotational movement comprises, for each blade 5, a spherical hinge 30 (commonly called a ball-joint) with radial contact and a crank 31. The spherical hinge 30 is mounted secured in a bracket of the outer synchronisation ring 29. The crank 31 (here consisting of the blade 5 foot 16) comprises at one end, a crank pin 32 mounted freely forward in the spherical hinge 30 along a substantially radial axis, this axis being offset in relation to the rotating axis Y of the blade 5. The crank 31 makes it possible to increase the force necessary to adjust the pitch of the corresponding blade 5.

The linear movement of the movable body 26 of the actuator 22 makes it possible to synchronically adjust the pitch of all the blades 5, in particular via the outer ring 29 of the LTB and the different transformation devices 23.

The fan 1 also comprises a device for feathering 33, 59 the blades 5, in particular in case of failure (or breakdown) of the control device 21, and for example, a failure in the hydraulic supply of the linear actuator 22. As a reminder, the feathered position corresponds to a positive pitch generally equal to 90°. According to the first embodiment represented in FIGS. 1 to 7, the feathering device 33 comprises at least one linear actuator 34, separate from the actuator 22 of the blade pitch control device 21.

The feathering device 33 either comprises one linear actuator 34 per blade 5, or one or more linear actuators 34 distributed regularly around the axis X for all the blades 5.

Such as illustrated in FIGS. 1 to 7, each actuator 34 comprises a body 35 and a movable member 36. The member 36 of the actuator 34 comprises a piston 37 moving forward into a cavity 38 of the body 35 along an axis A and a rod 39 coupled with the corresponding blade 5 (and more specifically, with the crank 31) via a spherical hinge 40. The piston 37 separates the cavity 38 into a first chamber 41 wherein the gas generator 9 is situated and a second chamber 42. The body 35 is connected to the rotor 3 via a ball-joint connection 43. The actuator 34 further comprises a first fluidic communication channel 44 between the first chamber 41 and the space 8, and a second fluidic communication channel 45 between the second chamber 42 and the space 8.

The actuator 34 is configured to occupy the following positions:
- a passive position (FIGS. 2, 4, and 6) wherein the first and second communication channels 44, 45 are open (normal functioning);
- an active position (FIGS. 3, 5, and 7) wherein the first communication channel 44 is blocked, the member 36 is moved into a reference position under the action of the gas generated and/or released by the generator 9 and the member 36 is locked in a reference position via the locking means 46, 57 (failure, feathering of the blades 5).

Figure 3:
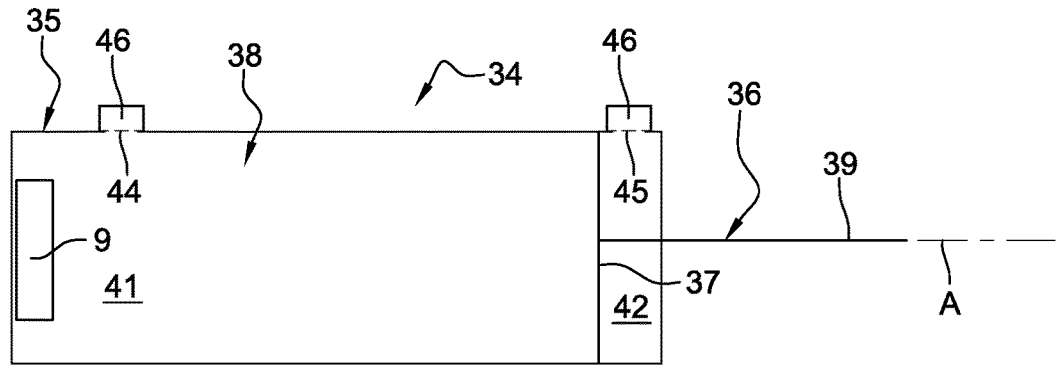
FIG. 3 is a schematic view of a first variant of the actuator in FIG. 1, in an active position.
Figure 5:
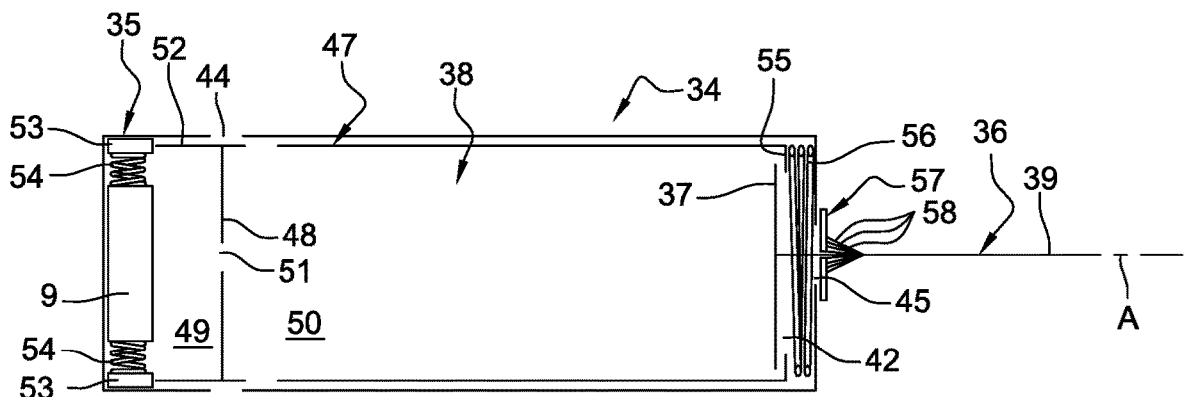
FIG. 5 is a schematic view of a second variant of the actuator in FIG. 1, in an active position.
Figure 7:
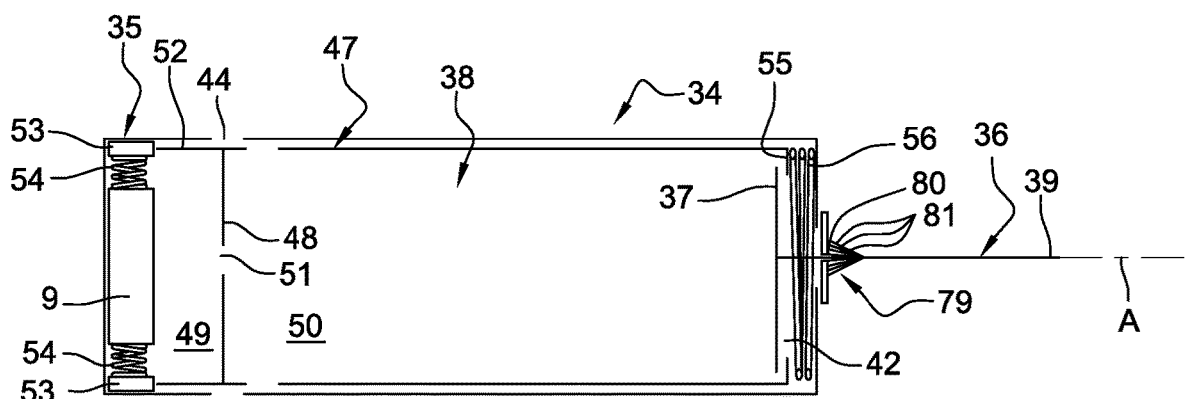

Such as illustrated in FIGS. 3, 5, and 7, in the reference position thereof, the rod 39 of the member 36 is out.

The actuator 34 can comprise means for damping the member 36, such as, for example, a damping cushion, the latter enabling to decrease the power of the impact of the member 36, during the movement thereof into a reference position.

Figure 2:
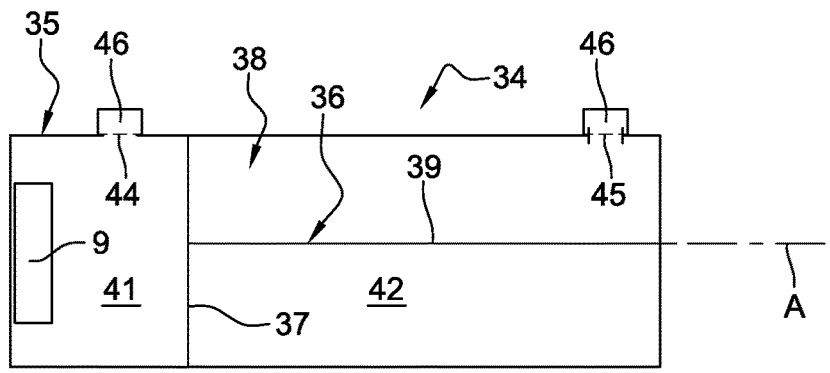
FIG. 2 is a schematic view of a first variant of the actuator in FIG. 1, in a passive position.

According to a first variant of the first embodiment, represented in FIGS. 2 and 3, the piston 37 of the member 36 extends sealed along the axis A. The first and second communication channels 44, 45 extend perpendicularly in relation to the axis A. In an active position, the first communication channel 44 is blocked via a blocking device 46 (autonomous or controlled) connected on the first communication channel 44. In the same way as for the first communication channel 44, in an active position, the second communication channel 45 is blocked via a blocking device 46 (indirect locking means) (autonomous or controlled) connected on the second communication channel 45.

During the passage from the passive position to the active position, for example, during a failure in the hydraulic supply of the linear actuator 22, the actuator 34 develops in the following way.

The first communication channel 44 is blocked via the corresponding blocking device 46. Under the action of the gas coming from the generator 9, the member 36 is moved into the reference position thereof. The gas present in the second chamber 42 is compressed, this makes it possible to cushion the end position of the member 36. The second communication channel 45 is blocked via the corresponding blocking device 46.

Figure 4:
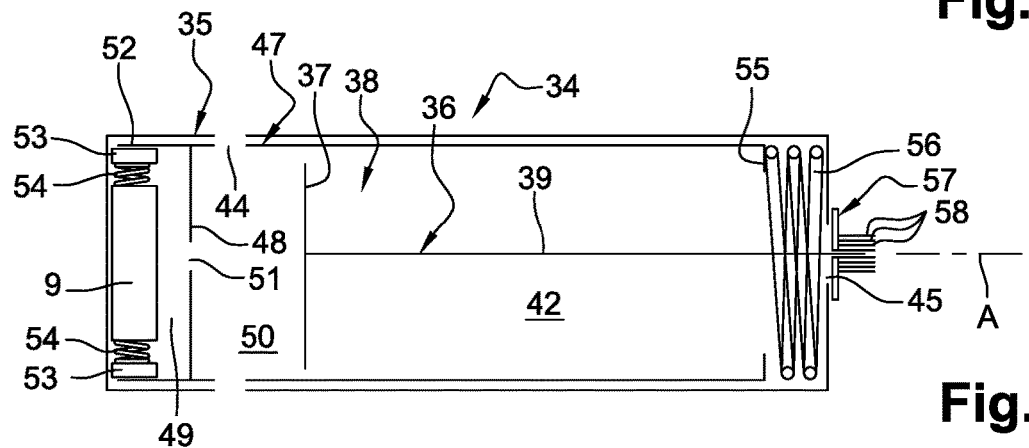
FIG. 4 is a schematic view of a second variant of the actuator in FIG. 1, in a passive position.

According to a second variant of the first embodiment, represented in FIGS. 4 and 5, the actuator 34 further comprises a tubular distribution slide 47 moving forward into the cavity 38 of the body 35. The slide 47 comprises a separating partition 48 delimiting the first chamber 41 into one first compartment 49 wherein the gas generator 9 is situated, and a second compartment 50. The partition 48 comprises a communication orifice 51 between the first compartment 49 and the second compartment 50. The first channel 44 is capable of putting the space 8 and the second compartment 50 in communication. The slide 47 is configured to block the first communication channel 44 when the actuator 34 is situated in an active position.

More specifically, the first communication channel 44 extends perpendicularly to the axis A. The second communication channel 45 is centered on the axis A.

The slide 47 comprises a first end 52 opposite to the partition 48 and delimiting the first compartment 49. In a passive position (FIG. 4), the first end 52 is situated radially between the body 35 and a sectored ring 53 surrounding the gas generator 9, this ring 53 being radially stressed to be supported against the first end 52 by the intermediary of one or more primary elastic loaded elements 54 (here, cylindrical loop compression springs). Each primary spring 54 extends, in this case, along a direction perpendicular to the axis A and is placed between the gas generator 9 and the ring 53. In a variant, the primary elastic elements 54 could be spiral-type springs or elastic rings.

The slide 47 comprises a second end 55 opposite the partition 48 and delimiting the second chamber 42. The second end 55 is presented in the form of a flap. In a passive position (FIG. 4), a secondary elastic element 56 at rest (here a cylindrical loop compression spring) is situated axially between the second end 55 and the body 35. The secondary spring 56 extends along the axis A and surrounds the rod 39 of the member 36.

During the passage thereof from the passive position to the active position, for example, during a failure in the hydraulic supply of the linear actuator 22, the actuator 34 develops in the following way.

Under the action of the gas generated and/or released by the gas generator 9, the slide 47 is moved forward along the axis A by being moved away from the gas generator 9. From the movement of the slide 47, the slide 47 blocks the first communication channel 44. The secondary spring 56 is loaded (partially compressed). Under the action of the primary springs 54, the gasket is moved radially by moving away from the gas generator 9 so as to be interleaved axially between the bottom of the body 35 and the first end 52, the gasket thus preventing the return of the slide 47 into the initial position thereof.

Under the action of the gas, entering into the second compartment 50 via the orifice 51, the member 36 is moved into a reference position. The secondary spring 56 contributes to the damping of the member 36. The dimensional characteristics of the second fluidic communication channel 45 can also contribute to the damping.

The member 36 is locked in a reference position by the intermediary of the rod 39 thereof via a blocking device 57 (direct locking means). The blocking device 57 (controlled or autonomous) is capable of blocking the rod 39 of the member 36 by rubbing (or friction).

More specifically, in the present case, such as illustrated in FIGS. 4 and 5, the blocking device 57 comprises strips 58 extending longitudinally along the axis A and surrounding the rod 39 of the member 36. In a passive position (FIG. 4), the strips 58 are at a distance from the rod 39. In an active position (FIG. 5), under the action of heat from the gases, the strips 58 are capable of being deformed and coming into contact with the rod 39 of the member 36, so as to block the latter by rubbing, in a reference position. Advantageously, the strips 58 are made of shape-memory alloy.

Advantageously, the communication orifice 51 is blocked by a breakable pellet, this pellet being capable of being broken under the pressure of the gas generated and/or released by the generator 9. This pellet makes it possible to isolate the gas generator 9, and thus avoid any pollution of the latter when the actuator 34 is in a passive position.

Figure 6:
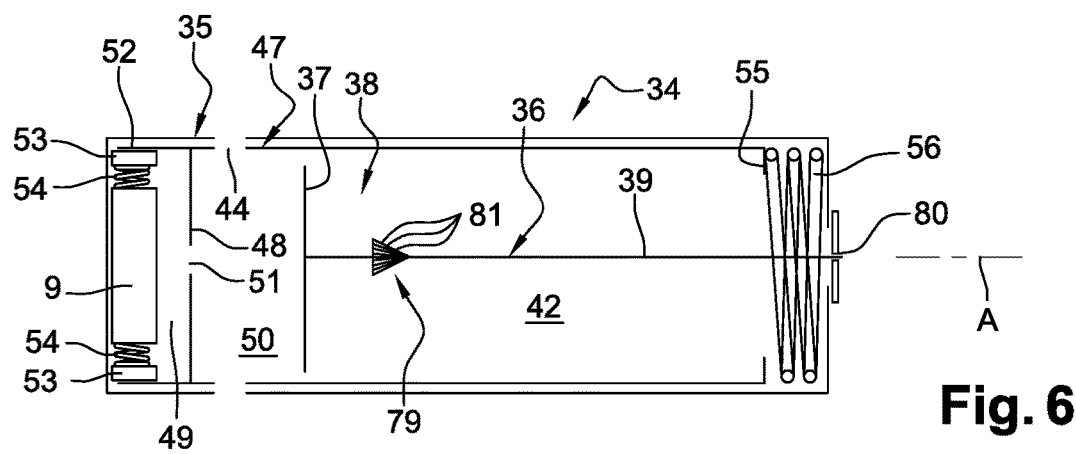
FIGS. 6 and 7 illustrate an alternative of the second variant illustrated in FIGS. 4 and 5.

According to an alternative of the second variant, represented in FIGS. 6 and 7, the member 36 is locked in a reference position by the intermediary of the rod 39 thereof via a blocking device 79 (direct locking means) secured on the latter.

The blocking device 79 has determined geometric, dimensional and mechanical characteristics to enable the irreversible passage of the blocking device 79 through the outlet orifice 80 of the rod 39, during the passage from the passive position (FIG. 6) to the active position (FIG. 7).

According to the example illustrated, the blocking device 79 is elastic (in other words, capable of being elastically deformed) and flared (here in conic form). More specifically, the blocking device 79 widens from the free end towards the piston 37. Such characteristics make it possible to facilitate the passage of the blocking device 79 through the orifice 80 but also to block the rod 39 in a reference position (FIG. 7). Indeed, once passed through the orifice 80, the blocking device 79 abuts against the outer edge of the orifice 80. The blocking device 79 comprises, for example, a plurality of flexible strips 81 extending along the axis A.

When the turbomachine 2 functions normally (no failure), the feathering device 33 is subordinated to the blade pitch control device 21, and more specifically, to the linear actuator 22. In this case, the actuator 34 is in a passive position.

In case of failure (failure in the hydraulic supply of the linear actuator 22), the control means instruct the feathering of the blades 5, the blade pitch control device 21 thus becomes subordinated to the device for feathering 33 the blades 5. In this case, the actuator 34 moves from a passive position to an active position. The movement of the member 36 into a reference position (or of the members 36 of the different actuators 34) synchronically enables the feathering of all the blades 5 of the rotor 3, in particular via the different transformation devices 23 and the outer synchronisation ring 29.

Figure 9:
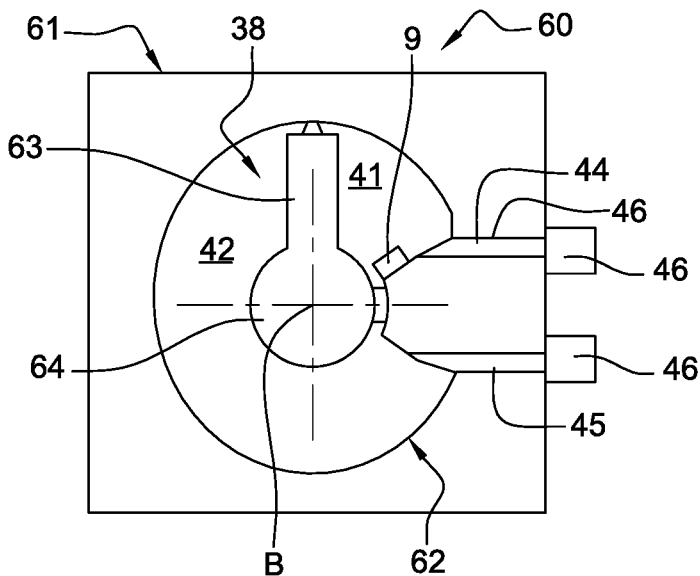
FIG. 9 is a schematic view of the actuator in FIG. 8.

According to the second embodiment represented in FIGS. 8 and 9, the feathering device 59 comprises at least one rotating actuator 60, separate from the actuator 22 of the blade pitch control device 21.

The feathering device 59 either comprises one rotating actuator 60 per blade 5, or one or more rotating actuators 60 regularly distributed around the axis X for all the blades 5.

Such as illustrated in FIGS. 8 and 9, each actuator 60 comprises a body 61 and a movable member 62. The member 62 of the actuator 60 comprises a pallet 63 moving in rotation around an axis B into a cavity 38 of the body 61, the pallet 63 being secured to a shaft 64. The pallet 63 is coupled, directly or indirectly, with the corresponding blade 5, and more specifically with the foot 16. The pallet 63 separates the cavity 38 of the body 61 into a first chamber 41 wherein the gas generator 9 is situated, and a second chamber 42. The body 61 is secured to the rotor 3. The actuator 60 further comprises a first fluidic communication channel 44 between the first chamber 41 and the space 8 and a second fluidic communication channel 45 between the second chamber 42 and the space 8.

The rotating actuator 60 is configured to occupy the following positions:
a passive position wherein the first and second communication channels 44, 45 are open; and
an active position wherein the first communication channel 44 is blocked, the member 62 is moved into a reference position under the action of the gas generated and/or released by the generator 9 and the member 62 is locked in a reference position via the locking means 46.

Such as illustrated in FIG. 9, the pallet 63 of the member 62 moves in rotation, sealed around the axis B. In an active position, the first communication channel 44 is blocked via a blocking device 46 (autonomous or controlled) connected on the first communication channel 44. In the same way as for the first communication channel 44, in an active position, the second communication channel 45 is blocked via a blocking device 46 (indirect locking means) (autonomous or controlled) connected on the second communication channel 45.

During the passage from the passive position to the active position, for example, during a failure in the hydraulic supply of the linear actuator 60, the actuator 60 develops in the following way.

The first communication channel 44 is blocked via the corresponding blocking device 46. Under the action of the gas coming from the generator 9, the member 62 is moved into the reference position thereof. The second communication channel 45 is blocked via the corresponding blocking device 46.

When the turbomachine 2 functions normally (no failure), the feathering device 59 is subordinated to the blade pitch control device 21, and more specifically, to the linear actuator 22. In this case, the actuator 60 is in a passive position.

In case of failure (failure in the hydraulic supply of the linear actuator 22), the control means instruct the feathering of the blades 5, the blade pitch control device 21 thus becomes subordinated to the device for feathering 59 the blades 5. In this case, the actuator 60 moves from a passive position to an active position. The movement of the member 62 into a reference position (or of the members 62 of the different actuators 60) enables, synchronically, the feathering of all the blades 5 of the rotor 3, in particular via the different transformation devices 23 and the outer synchronisation ring 29.

Figure 11:
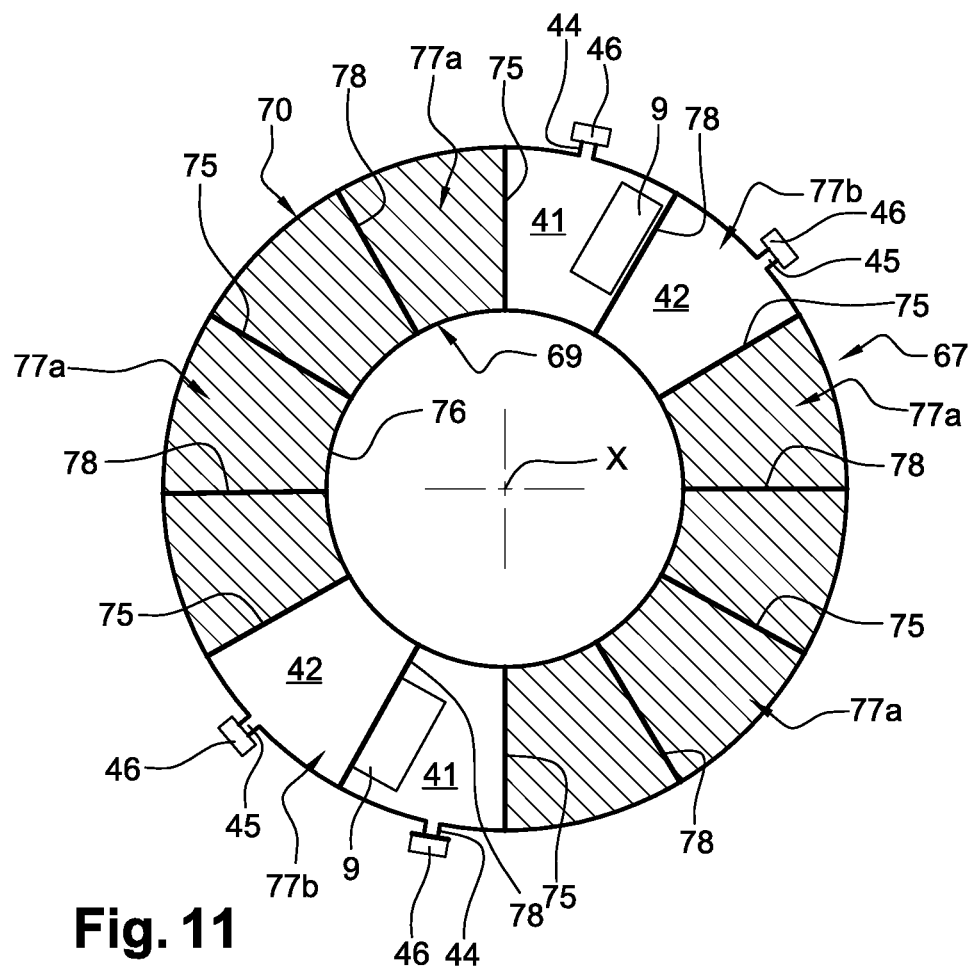
FIG. 11 is a schematic cross-sectional view of the actuator in FIG. 10.

According to a third embodiment illustrated in FIGS. 10 and 11, a blade pitch control device 65 and a device for feathering 66 the blades 5 comprise a common rotating actuator 67, centered on the axis X, common to all the blades 5 and a device for transforming movement 68 specific to each one of the blades 5, this transformation device 68 enabling to transform the rotating movement initiated by the rotating actuator 67 into a rotating movement of the corresponding blade 5.

The common rotating actuator 67 comprises a body 69 put back on the shaft 7 of the rotor 3 and a member 70 moving in rotation around the axis X in relation to the body 69. Advantageously, the rotating actuator 67 is pallet and hydraulic.

Such as illustrated in FIG. 10, the movement transformation device 68 comprises, for each blade 5, a spherical hinge 71 (commonly called ball-joint) with radial contact, a rod 72 and a crank 73. The spherical hinge 71 is mounted so that it can be moved forward into a bracket of a rod 72 put back on the member 70. The crank 73 (here consisting of the blade 5 foot 16) comprises at one end, a crank 74 mounted freely forward in the spherical hinge 71 along a substantially radial axis, this axis being offset in relation to the rotating axis Y of the blade 5. The crank 73 makes it possible to increase the necessary force to adjust the corresponding pitch of the blade 5.

The rotating movement of the member 70 of the actuator 67 makes it possible to synchronically adjust the pitch of all the blades 5 (respectively the feathering of the blades 5) in particular via the different transformation devices 68.

More specifically, such as illustrated in FIG. 11, the body 69 comprises six walls 75 regularly distributed around the axis X. Each wall 75 radially protrudes from a central core 76 put back on the shaft 7 and extends axially along the axis X. Between two consecutive walls 75, the body 69 defines a sealed cavity. Among the six sealed cavities of the rotating actuator 67, four of them are referred to as primary (filled with hatchings) and two of them are referred to as secondary. The primary cavities 77a are assigned to the blade pitch control device 65 and the secondary cavities 77b are assigned to the device for feathering 66 the blades 5. In this case, the primary cavities 77a are paired and diametrically opposite in relation to the axis X. The secondary cavities 77b are diametrically opposite in relation to the axis X.

For each cavity 77a, 77b, the member 70 comprises a pallet 78 mounted sealed in the corresponding cavity 77a, 77b, the pallet 78 separating the cavity 77a, 77b into a first chamber 41 and a second chamber 42.

The primary cavities 77a are capable of being supplied with pressurised fluid (for example, oil in the case of a hydraulic actuator). To make it clear, the means for supplying the primary cavities 77a have not been represented.

For each secondary cavity 77b, a gas generator 9 is situated in the first chamber 41. The actuator 67 comprises, for each secondary cavity 77b, a first fluidic communication channel 44 between the first chamber 41 and the space 8 and a second fluidic communication channel 45 between the second chamber 42 and the space 8.

The actuator 67 is configured to occupy the following positions:
a passive position wherein the first and second communication channels 44, 45 are open; and
an active position wherein the first communication channels 44 are blocked, the member 70 is moved into a reference position under the action of the gas generated and/or released by the generators 9 and the member 70 is locked in a reference position via the locking means 46.

In an active position, the first communication channels 44 are each blocked via a blocking device 46 (autonomous or controlled). In the same way as for the first communication channel 44, in an active position, the second communication channels 45 are each blocked via a blocking device 46 (indirect locking means) (autonomous or controlled).

During the passage from the passive position to the active position, for example, during a failure in the hydraulic supply of the rotating actuator 67, the actuator 67 develops in the following way.

The first communication channels 44 are blocked via the blocking devices 46. Under the action of the gas coming from the generator 9, the member 70 is moved into the reference position thereof. The second communication channels 45 are blocked via the corresponding blocking devices 46.

When the turbomachine 2 functions normally (no failure), the feathering device 66 is subordinated to the blade pitch control device 65. The secondary cavities 77b are subordinated to the primary cavities 77a. In this case, the actuator 67 is in a passive position.

In case of failure (failure in the hydraulic supply), the control means instruct the feathering of the blades 5, the blade pitch control device 65 thus becomes subordinated to the device for feathering 66 the blades 5. The primary cavities 77a are thus subordinated to the secondary cavities 77b. In this case, the rotating actuator 67 moves from a passive position to an active position. The movement of the member 70 into a reference position enables, synchronically, the feathering of all the blades 5 of the rotor 3, in particular via the different transformation devices 68.

Generally, when the turbomachine 2 functions normally (no failure), the feathering device 33, 59, 66 is subordinated to the blade pitch control device 21, 65. More specifically, the movement of the movable element 26, 70 of the actuator 22, 67 of the pitch control device 21, 65 drives a movement of the movable member 36, 62, 70 of the actuator 34, 60, 67 of the feathering device 33, 59, 66 (actuator 34, 60, 67 in a passive position).

In case of failure (for example, failure in the hydraulic supply), the control means instruct the feathering of the blades 5, the blade pitch control device 21, 65 thus becomes subordinated to the feathering device 33, 59, 66. More specifically, the movement of the movable member 36, 62, 70 of the actuator 34, 60, 67 of the feathering device 33, 59, 66 drives a movement of the movable element 26, 70 of the actuator 22, 67 of the pitch control device 21, 65 (actuator 34, 60, 67 in an active position).

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A turbomachine module of longitudinal axis, the module comprising:
a rotor supporting variable pitch blades, and comprising an inner annular shaft;
a blade pitch control device;
a device for feathering at least one blade of the variable pitch blades, the device for feathering comprising a gas generator placed between a body and a movable member of an actuator;
wherein the blade pitch control device and the device for feathering are situated radially between the inner annular shaft and the variable pitch blades, the movable member being coupled with the at least one blade and configured, under the action of gas generated or released by the gas generator of being moved into a reference position wherein the movable member entails a feathered position to the at least one blade.

2. The turbomachine module according to claim 1, wherein the gas generator comprises a pyrotechnic charge and a device for igniting the pyrotechnic charge.

3. The turbomachine module according to claim 2, wherein the gas generator comprises a pressurised gas tank, the pressurized gas tank being capable, under the combusting action of the pyrotechnic charge or via a release device, of releasing pressurised gas from the pressurized gas tank.

4. The turbomachine module according to claim 1, wherein the movable member comprises a piston moving forward into a cavity of the body, the piston separating the cavity into a first chamber wherein the gas generator is situated and a second chamber, the actuator further comprising a first fluidic communication channel between the first chamber and a space and a second fluidic communication channel between the second chamber and the space, the actuator being configured to occupy the following positions:
  a passive position wherein the first and second communication channels are open;
  an active position wherein the first communication channel is blocked, the moveable member is moved into a reference position under the action of the gas generated or released by the gas generator and the moveable member is locked in a reference position via a locking means.

5. The turbomachine module according to claim 4, wherein the actuator further comprises a tubular distribution slide moving forward into the cavity of the body, the slide comprising a separating partition delimiting the first chamber into a first compartment wherein the gas generator is situated and a second compartment, the partition comprising a communication orifice between the first compartment and the second compartment, the first channel being capable of putting the space and the second compartment in communication;
  the slide being configured to block the first communication channel when the actuator is situated in an active position.

6. The turbomachine module according to claim 4, wherein the locking means comprise strips between which the moveable member is situated, the strips preferably being made of shape-memory alloy.

7. The turbomachine module according to claim 1, wherein the movable member comprises a pallet moving in rotation in a cavity of the body, the pallet separating the cavity into a first chamber wherein the gas generator is situated and a second chamber, the actuator further comprising a first fluidic communication channel between the first chamber and a space and a second fluidic communication channel between the second chamber and the space, the actuator being configured to occupy the following positions:
  a passive position wherein the first and second communication channels are open;
  an active position wherein the first communication channel is blocked, the moveable member is moved into a reference position under the action of the gas generated or released by the gas generator and the moveable member is locked in a reference position via a locking means.

8. The turbomachine module according to claim 1, wherein the blade pitch control device comprises the actuator.

9. The turbomachine module according to claim 1, wherein the actuator comprises means for damping the movable member when the movable member is moved into the reference position thereof.

10. A turbomachine comprising the module according to claim 1, the turbomachine further comprising means for controlling the device for feathering.

11. A turbomachine module of longitudinal axis, the module comprising:
  a rotor supporting variable pitch blades, and comprising an inner annular shaft;
  a blade pitch control device;
  a device for feathering at least one blade of the variable pitch blades, the device for feathering comprising a gas generator placed between a body and a movable member of an actuator;
  wherein the blade pitch control device and the device for feathering are situated radially between the inner annular shaft and the variable pitch blades, the movable member being coupled with the at least one blade and configured, under the action of gas generated and released by the gas generator of being moved into a reference position wherein the movable member entails a feathered position to the at least one blade.

* * * * *